(12) United States Patent
Townsend et al.

(10) Patent No.: US 7,974,715 B2
(45) Date of Patent: Jul. 5, 2011

(54) AUDIO/VIDEO TRANSCRIPTION SYSTEM

(75) Inventors: Steven L. Townsend, Phoenix, AZ (US);
Derrill P. Williams, Scottsdale, AZ (US); Neil R. Jones, Woodvale (AU);
Stephen J. Fewings, Floreat (AU)

(73) Assignee: FTR Pty, Ltd., Perty (AU)

( * ) Notice: Subject to any disclaimer, the term of this patent is extended or adjusted under 35 U.S.C. 154(b) by 1086 days.

(21) Appl. No.: 11/724,729

(22) Filed: Mar. 16, 2007

(65) Prior Publication Data
US 2007/0286032 A1    Dec. 13, 2007

Related U.S. Application Data

(60) Division of application No. 10/179,598, filed on Jun. 25, 2002, now Pat. No. 7,212,873, which is a continuation-in-part of application No. 09/346,430, filed on Jul. 1, 1999, now Pat. No. 6,871,107.

(51) Int. Cl.
*G06F 17/00* (2006.01)
*G11B 19/00* (2006.01)

(52) U.S. Cl. .................. 700/94; 369/25.01; 704/272
(58) Field of Classification Search .............. 700/94; 704/235, 272, 270; 369/25.01, 63, 32.01; 715/716, 723, 727, 978
See application file for complete search history.

(56) References Cited

U.S. PATENT DOCUMENTS 5,949,952 A * 9/1999 Bennett et al. .............. 386/46
6,332,147 B1 * 12/2001 Moran et al. ............... 715/203
6,871,107 B1 * 3/2005 Townsend et al. ........... 700/94

* cited by examiner

*Primary Examiner* — Xu Mei
(74) *Attorney, Agent, or Firm* — Stoneman Law Patent Group; Martin L. Stoneman

(57) ABSTRACT

A computer based digital transcription system employs audio and video inputs of a court proceeding, and stores the digital signals in a memory in the form of distinct file segments of a predetermined time length during each recording session. The computer associates a date and time and a third identifier, such as location, with each distinct file segment. Playback of any desired segment may be effected during recording or at any time afterward; and playback does not interfere with the recording of realtime information.

5 Claims, 5 Drawing Sheets

AUDIO/VIDEO TRANSCRIPTION SYSTEM

RELATED APPLICATIONS

This application is a division of application Ser. No. 10/179,598, filed Jun. 25, 2002 now U.S. Pat. No. 7,212,873, which in turn is a continuation-in-part of application Ser. No. 09/346,430 filed Jul. 1, 1999, now U.S. Pat. No. 6,871,107 issued Mar. 22, 2005.

BACKGROUND OF THE INVENTION

1. Field of the Invention

The present invention relates generally to transcription systems used to record transcripts of court proceedings and the like, and more particularly, to a computer-based digital transcription system that eases the task of recording and copying such transcripts.

2. Description of the Relevant Art

It has long been customary during court proceedings and administrative hearings to record written transcripts of such proceedings with the help of a court stenographer for later review and reference. In recent years, many courtrooms have switched to audio transcript recordings; in such instances, a stenographer need not be present during the proceedings. Judges or attorneys desiring a copy of the audio transcript are provided with copies of the recorded audio track, which can be transcribed into a written transcript at a later date, if necessary.

The first such audio transcript recording systems relied upon magnetic tape as a recording medium. One or more microphones are placed around the courtroom to pick up the voices of the judge, attorneys, and witness. The microphones are connected to a mixer/pre-amplifier which feeds a magnetic tape recorder for recording one or multiple audio tracks on the magnetic tape. Copies can later be made by playing back the recorded tape and "dubbing" the audio tracks onto a new blank tape. Such systems are generally disclosed in U.S. Pat. No. 3,798,387 to Gallagher, Jr., and in U.S. Pat. No. 3,879,751 to Gimelli.

Efforts have been made to integrate court reporting systems with computers. For example, in U.S. Pat. No. 4,924,387 (reissued as Re. 35,658) discloses a computerized court reporting system wherein a computer is used to operate and index a video cassette recorder (VCR) used to record both audio and video tracks on magnetic video tape. U.S. Pat. No. 5,426,510 to Meredith discloses an audio-video system for use in a courtroom wherein a logic controller selectively couples certain microphones and video cameras to a series of video cassette recorders.

All of the foregoing court reporting systems rely upon the use of magnetic tape. Magnetic tape has certain inherent disadvantages. First, it often binds in the recording/playback equipment, which can result in the loss of all or portions of the recorded proceedings. Secondly, it is difficult to accurately index magnetic tape; while magnetic tape recording/playback equipment often includes a tape counter, such counters are notoriously unreliable. It takes a relatively long time to physically move from one portion of the tape to a different portion of the tape, as by rewinding or fast-forwarding, when searching for a desired portion. In addition, the process of making duplicate tapes requires the "dubbing" procedure described above. Moreover, the quality of signals recorded on magnetic tape degrades with time. Furthermore, the record and playback heads of conventional magnetic tape recording equipment require frequent maintenance to ensure satisfactory results.

In some instances, a judge or one of the attorneys may need to hear prior testimony, or prior argument, played back during court proceedings. When magnetic tape is used to record the proceedings, then the tape must be stopped, rewound to the relevant portion, and played back. The tape must then be fast-forwarded back to the point where the tape was stopped before proceedings can continue. Apart from the delay that this procedure necessitates, no record of the proceedings can be made during the time that the tape is being rewound, played back, and fast-forwarded back to the remaining blank portion of the tape.

More recently, audio transcription systems have been introduced that digitize audio signals. U.S. Pat. No. 5,369,704 to Bennett, et al., and assigned to Engate Incorporated of Chicago, Ill., discloses, in one embodiment, a court reporting system wherein an analog voice signal generated by a microphone is converted, via an analog-to-digital converter circuit, to a series of digital values to generate a written transcript. Digital audio signals can be stored in the memory of a computer, e.g., in the form of a ".wav" file, so-named because such digital audio computer files often have the file extension ".wav" at the end of the file name. Some known digital audio transcription systems operate to store digital voice signals via a computer.

While movement of audio recording toward digital audio offers much potential, it also introduces a host of new problems. Computer files stored in the memory of a computer can easily become corrupted due to either hardware problems or software problems, rendering such files worthless, and potentially costing the loss of hours of courtroom proceedings. Moreover, computerized audio transcription systems have the appearance of being complicated and overwhelming to many court reporters and court clerks; for example, they often have trouble determining when they are monitoring an ongoing recording as compared with playing back an earlier recording. Moreover, a user seeking to locate relevant digital audio files stored in the memory of a computer often finds it difficult to locate all of the files that belong to a particular recording session. Even when such files are all located, it is still a burden to find the particular file containing a desired portion of the transcript; once the proper file is found, the length of such file may make it difficult to find a particular portion contained therein for playback.

Accordingly, it is an object of the present invention to provide a digital transcription system which eliminates the need for reliance upon unreliable magnetic tape.

It is another object of the present invention to provide such a transcription system which allows instant access to any specific recorded segment by indexing such segment with the time at which such segment was recorded.

Still another object of the present invention is to provide such a transcription system which can easily produce highly-stable archival copies of a transcript for long-term storage.

Yet another object of the present invention is to provide such a transcription system which can easily be used to create complete audio, real time text, or video, transcript copies for judges or attorneys at the end of each day's proceedings, but which can also be used to quickly and easily create custom-ordered transcripts that provide only those portions of the proceedings which were carried out between preselected starting and stopping times.

A further object of the present invention is to provide such a transcription system that can be controlled by a single user under the control of a simple personal computer.

A still further object of the present invention is to provide such a transcription system that prevents a user from being confused as between controlling recording operations as compared with controlling playback/copying operations.

An additional object of the present invention is to provide such a transcription system that allows for playback of previously recorded proceedings while continuing to record the proceeding during such playback period.

These and other objects of the present invention will become more apparent to those skilled in the art as the description of the present invention proceeds.

SUMMARY OF THE INVENTION

Briefly described, and in accordance with a preferred embodiment thereof, the present invention relates to a digital transcription system that includes a source of real time digital signals to be recorded, such as a digital video, audio, text or the like and a computer including a display screen, as well as a storage memory for storing such digital signals and thereafter allowing the stored digital signals to be played back; this storage memory may be in the form of a computer hard drive. The transcription system also includes a recording control mechanism for signaling the computer when to start and stop recording the digital signals; this control mechanism can be in the form of one or more graphical buttons displayed on the computer's display screen, analogous to the RECORD and STOP buttons provided on the control panel of a tape recorder. The period between the time that recording is started and the time that recording is stopped is referenced herein as a recording session.

One aspect of the present invention relates to the manner by which files created during two or more recording sessions are stored and retrieved for playback. In this regard, the computer is responsive to the aforementioned recording control mechanism for storing the digital signals in the storage memory during each recording session. The computer creates and stores at least one distinct file segment during each such recording session in order to record the digital signals that were received by a video camera, microphone, or other digital input device during such recording session. Each such file segment has a date and time associated therewith to uniquely identify each such file segment.

When a user desires to playback portions of a recorded transcript, the user requests the computer to display a list of transcripts that are stored in the memory. While one transcript may include a number of file segments, recorded during a number of recording sessions on a given date, the computer does not display every file segment to the user; instead, the computer causes the display screen to display a list of virtual file entries, each being associated with a given date. Preferably, when there are two or more unique locations at which recordings are made, such as two or more different courtrooms, then the virtual file entries will be displayed showing recordings on a given date for each different location. The transcription system includes a playback selection mechanism, which may simply take the form of a computer mouse cursor displayed on the computer screen, for allowing a user to select a desired virtual file entry from those displayed on the screen. The computer responds to the playback selection mechanism by retrieving from the storage memory all of the stored file segments that collectively compose the selected virtual file entry, i.e., those file segments associated with the selected date and location. These files are "ordered" chronologically in accordance with the time associated with each such file. In this manner, the transcription system seamlessly merges together the file segments to form a continuous digital signal track.

In the preferred form of the present invention, each file segment has a maximum time length; for example, five minutes of recorded material. The computer monitors the time length of each file segment being stored during a current recording session. If the time length of the current file segment reaches the maximum time length and recording has not been stopped, then the computer closes the currently opened file segment and immediately creates and opens a new file segment for storing additional portions of the current recording session. Thus, any recording session that exceeds the predetermined maximum time length results in the creation of at least two file segments. If, for example, the maximum time length is set to be five minutes, and a recording session lasts 48 minutes, then ten separate file segments will be created during such recording session, the first nine file segments each being five minutes in time length, and the tenth file segment being three minutes in time length. By limiting the time length of each file segment, the present invention lessens the likelihood that other file segments might become corrupted; in other words, it isolates the corruption to a smaller amount of the total material recorded.

To further minimize the possibility of recorded signals becoming damaged or corrupted, the preferred embodiment of the present invention includes an external storage medium, such as a "zip" drive or writable CDROM drive coupled to the computer for archiving digital signals recorded by the storage memory of the computer. Preferably, the computer regularly copies each newly-created file segment to such external storage medium for archival purposes. This archiving feature can be performed every few seconds even though the current file segment still is open; alternatively, archiving can be performed each time the computer closes a file segment, either because recording was stopped, or because the current file segment reached its predetermined time length. Preferably, the file name for each archived file segment copied to the external storage medium includes the date of recording and the start time at which the digital signals recorded by such file segment were first recorded.

As mentioned above, each file segment has a time and date associated therewith. Ideally, the time and date are associated with the file segment by incorporating such time and date information into the name of the file segment. Preferably, the file name also incorporates location information, such as the particular courtroom involved, to help distinguish transcripts that may have been made on the same date in two or more different courtrooms. In addition, it is preferred that the time that is associated with such file segment is the exact time or real time at which recording began for such file segment. The files stored in such file segments normally are linear in the sense that the sounds and/or video or other inputs recorded therein over a fixed period of time will always take up the same amount of file space, and two seconds worth of recorded sound and/or video or other inputs will take up exactly twice the space as one second of recorded sound and/or video or other inputs. Although this is the preferred storage technique, other techniques, such as variable bit rate recording which do not produce such a direct correlation between time and recording space may be used. Armed with the recording start time of each file segment, the computer can easily detect discontinuities (indicating that a recording session starts at the beginning of a particular file segment, or that it stops at the end of a particular file segment). These start and stop points can be graphically displayed to a user on a playback screen in the form of tick marks appearing on a graphical timeline; the graphical timeline represents the selected virtual file entry in the form of an entire day's worth of recording sessions on the desired date, and the tick marks designate each point in time when recording was stopped and restarted.

Since the computer "knows" the time at which each file segment began recording, and since the computer "knows" the fixed time rate at which data is stored in each such file segment, the computer can easily locate a point in the selected transcript corresponding to any particular desired time of the proceedings. The computer can likewise locate any range of times within the recorded transcript as selected by the user. In this regard, the playback screen of the computer preferably includes a selection mechanism that allows the user to select a desired starting point and a desired ending point on the aforementioned displayed graphical timeline; this selection mechanism may simply be a conventional mouse pointer used to "click" on selected portions of the displayed graphical timeline. The computer is responsive to the selected starting point and ending point for creating a subset virtual file, the subset virtual file including only those file segments (or portions of file segments) which contain digital signals recorded between the selected starting point and selected ending point.

In order to help eliminate user confusion as between confidence monitoring during recording, on one hand, versus actual playback on the other hand, the transcription system of the present invention preferably uses two distinct and different panels or screens for controlling recording operations and playback operations, respectively. The two display screens each include a display control, or Panel Change, "button", which may be graphically represented on the display screen, for toggling the display between the recording panel and the playback panel, depending upon whether a user desires to control recording operations or playback operations. The toggling of the display screen may result in the recording panel becoming more emphasized than the playback panel, or vice versa. Preferably, toggling the display screens actually makes one such screen disappear from view so that the user can only see one such display screen at a time.

When the recording panel is displayed, control buttons are displayed for controlling recording operations, such as the starting and stopping of a recording session. Ideally, the recording panel allows the user to activate a confidence monitoring feature whereby the computer accesses stored digital signals from memory shortly after they are stored during recording operations; these accessed digital signals are coupled to corresponding converter circuits for converting the accessed digital signals to electronic audio and video signals. A sound generator, such as a headset or earphone, coupled to a digital-to-audio converter circuit then transforms the converted electronic audio signals into audible sounds for allowing the user to monitor the signals that have just been stored in memory in order to be confident that such digital signals are being stored reliably. Similarly, a video monitor displays the video signals which have just been stored in memory for monitoring and reliability checking by the user. On the other hand, when the playback panel is displayed, confidence monitoring is deactivated, and control buttons are displayed to signal the computer to access stored digital signals for either playback or copying. The displayed "buttons" are preferably analogous to those physical buttons one might find on an audio tape recorder or video cassette recorder.

It should be noted that the transcription system of the present invention permits recording to continue even when the playback panel is displayed, so long as recording is not stopped in the record panel. The computer continues to store incoming digital signals into the memory when the selected source of signals is to be recorded even when the computer screen is toggled to the playback panel. Moreover, playback of earlier recorded digital signals may take place concurrently with the recording of incoming digital signals in real time. The computer accesses the memory quickly enough so that accesses of previously stored digital signals do not interfere with the storage of new incoming digital signals.

DETAILED DESCRIPTION OF THE PREFERRED EMBODIMENT

In the following description, the term "video" is defined as inputs including actual streaming images from a video camera, vector graphics inputs from a "white board" or other input, still images and real time text from a court reporter.

Figure 1:
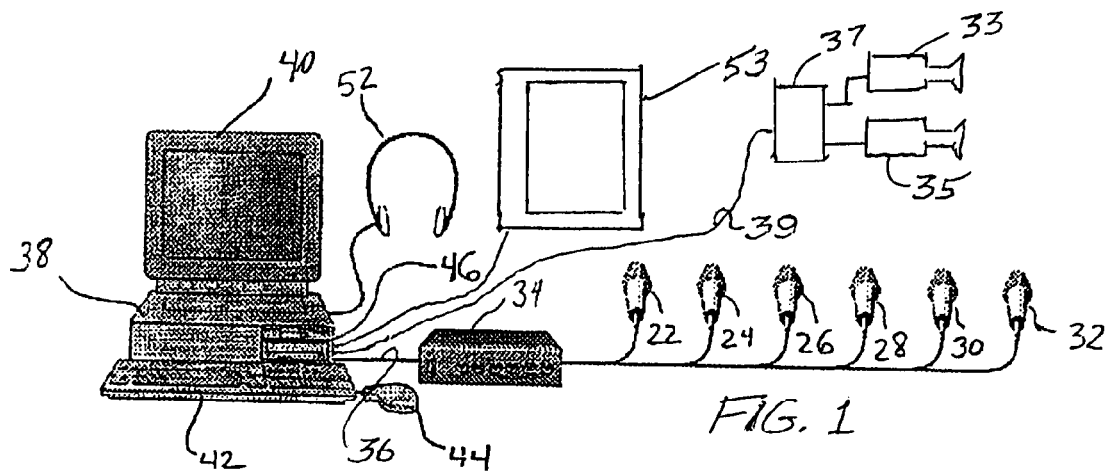
FIG. 1 is a schematic drawing of a digital audio/video transcription system in accordance with a preferred embodiment of the present invention.

Referring to FIG. 1, a digital audio/video transcription system for use in a courtroom or elsewhere, and embodying the present invention, is shown schematically. The present description will assume that such system is being used within a courtroom, it being understood that such system may be used in other environments. A series of microphones 22, 24, 26, 28, 30 and 32 are positioned about the courtroom (e.g., at the Judge's bench, at the witness stand, at counsel tables, near the jury box, etc.), each such microphone serving as a source of audio signals to be recorded. Since the number of microphones commonly exceeds the number of channels being recorded, it is known to couple each of the microphones by an audio cable to an audio mixer 34 for allowing the volume level/sensitivity of each microphone to be adjusted, and for mixing two or more of the incoming audio sources into a single channel or track. In the courtroom environment, up to sixteen microphones might be connected for input, and mixer 34 can then reduce the number of output signals to 1, 2, or 4 signals as required for recording. Smaller, less expensive mixers, might be able to receive a maximum of four input signals and can output 1, 2 or 4 signals for recording. Certain mixers have the ability to automatically control the gain of input signals, boosting the level of faint signals and softening very loud signals, in order to lessen variations in the recorded digital audio record. Typically, mixer 34 produces either two or four mixed output channels, the number of output channels being fewer than the original number of microphones. Mixer 34 may be of the type commercially available from FTR, Ltd. of Phoenix, Ariz. under Model No. MX4, which provides four channels of output. Apart from combining such audio signals into channels, mixer 34 can also be used to provide sound to a public address system or to mute certain microphones as needed for sidebar conferences. Mixer 34 produces one, two or four output channels, each of which is coupled by suitable audio cabling 36 to a sound card (not shown) installed within a personal computer 38.

In addition to the microphones 22, 24, 26, 28, 30, 32, the audio/video transcription system also utilizes digital video cameras or camcorders (or other video inputs, as defined above) positioned at one or more locations in the courtroom. Two such cameras, 33 and 35, are shown in FIG. 1. Typically one of the cameras would be focused on the witness stand, another on the position of the interrogating lawyer, perhaps a third on the judge; or a single camera could be employed to cover all or a large part of the courtroom, including the active participants. If a single camera 33 or 35 is used, its input is applied over suitable cabling 39 to a video card (not shown) installed within the personal computer 38. If two or more cameras 33 or 35 are employed, their inputs may be supplied to a channel selection control 37, which, under the control of the user, selects the particular camera 33, 35 (or additional cameras) for display via the computer 38 on a video display monitor 53 or on the computer monitor 40. The output from such a selection control 37 is supplied, in the manner described previously, over the cabling 39. If the video input is analog, an analog-to-digital converter may be included in the control 37.

Personal computer 38 is of the so-called "IBM compatible" type and is powered by a processor having the performance of an Intel Pentium II-233 (233 MHZ processor clock speed) or higher. Personal computer 38 should include at least 48 megabytes of random access integrated circuit memory (RAM). Personal computer 38 should also include a hard drive of sufficient capacity to satisfy the needs of the court; in this regard, it may be noted that 4-channel digital audio recordings consume approximately 90 megabytes (or less) of hard disk space for every hour of recording. Thus, a seven-hour recording session of audio only would consume 630 megabytes of hard disk space. Digital video recording consumes a greater amount of hard disk space for every hour of recording than digital audio recordings. Since hard disks having capacities in excess of 15 gigabytes are now widely available, many days worth of digital audio/video transcripts may be saved on a single hard disk. The term "memory" as used herein is intended to encompass hard disks, RAMS, and any other forms of relatively high speed storage. On the other hand, it should be noted that the digital audio and digital information initially stored on the hard disk is not considered to be a permanent form of recording; as explained below, high-capacity removable media, such as Recordable CDROMs (CD-Rs), Zip disks, recordable DVD, or magneto optical disks, should be used to create a permanent record of the digital transcript. As shown in FIG. 1, personal computer 38 also includes a display monitor 40, a keyboard 42, and a mouse 44 or like pointing device.

As mentioned above, personal computer 38 includes a sound card and a video card (not shown). The preferred embodiment of the present invention is designed to be operate with virtually any Microsoft Windows®-compatible sound and video cards to perform both recording and playback. Standard computer sound cards are typically stereo and will thus record only two separate channels of audio. On the other hand, if a court wishes to record four separate channels of audio, a 4-channel sound card is installed in personal computer 38 instead. Such 4-channel sound cards fit in the same type of expansion slot in personal computer 38 as would be used for a more common stereo sound card. One such preferred 4-channel sound card is commercially available from Antex under Model No. LX-44 Digital Audio Adapter. Such 4-channel sound cards have the ability to record four channels of audio rather than the standard two. Digital audio recorded in 4-channel format can still be replayed on any standard stereo sound card. The video card may be any standard video card used with a personal computer 38.

The computer sound card includes one or more analog-to-digital converter circuits for converting the audio signals to digital signals. This process is known as "digitizing" the audio signals. Personal computer 38 then stores the digital signals provided by such analog-to-digital converter circuit (s), initially on the computer's hard drive. The stored digital audio signals can later be played back or stored to a more permanent form of storage.

Figure 2:
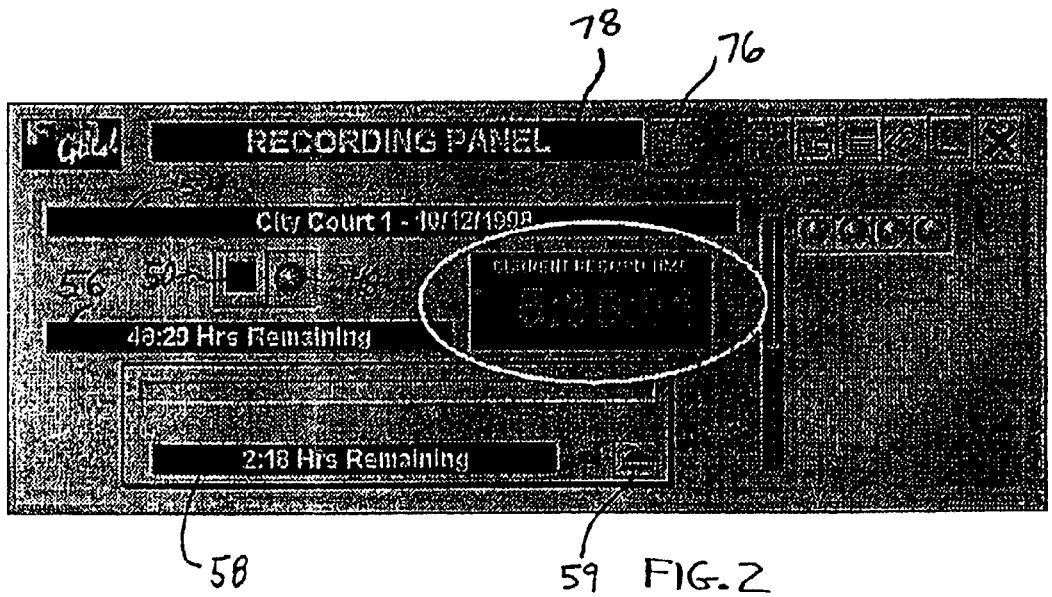
FIG. 2 is an image of a recording panel as displayed on the personal computer monitor during recording operations.

When the operator of digital transcription system 20 enters the courtroom in the morning, the operator turns on personal computer 38, loads the software described herein, and powers up mixer 34. Upon loading the aforementioned software, a recording panel similar to that shown in FIG. 2 is displayed on the monitor 40, except that the displayed "current record time" is blank. Before starting a recording session, the operator preferably activates the Archive feature of the system. With reference to FIG. 2, archiving is enabled by placing the mouse cursor over button 59 of the simulated CDROM drive and clicking the left mouse button to toggle-on the archive storage media drive. Likewise, archiving can be disabled by toggling-off button 59. By enabling archiving during recording, digital transcription signals (audio, video, or both) will be copied to permanent storage media quickly and automatically throughout the day. Preferably, personal computer 38 includes a Writable CDROM drive 46 which can store information onto Writable CDROM disks. The digital signals stored on the hard drive are also stored on the Writable CDROM disk, which provides the court with extra security that the court record will not be lost. Such Writable CDROM disks, or CD-Rs, are a cost effective and durable media that can archive a full day of proceedings in 4-channel format. Such forms of permanent storage media are sometimes referred to herein as "external storage media" in the sense that such Writable CDROM disks or Zip disks are adapted to be removed from, and stored externally from, personal computer 38.

As each stored file segment is completed, as a result of a recording session being stopped, or because the personal computer 38 stops appending new data to a file segment as each file segment reaches its predetermined time length, personal computer 38 copies each newly-completed file segment to such external storage medium for archival purposes. Alternatively, archiving can be performed "on the fly" at frequent intervals, e.g., every few seconds, without waiting for the current file segment to be closed. Archiving on the fly does not require any special software if the archival media is a magnetic media like a Zip disk. On the other hand, if Writeable CD-R disks are used, software is commercially available from Adaptec under the trade designation "Direct CD" which permits the CD-R drive to appear just like a hard disk from the standpoint of creating file handling. Such Direct-CD software is useful for incrementally adding small (or large) amounts of data to a CD-R disk, and permits the current contents of the current file segment to be sent to the CD-R disk for archiving even before the current file segment has been closed.

Just as with an older audio or video tape recorder system, the operator may begin a test recording before court proceedings actually begin to ensure that all microphones and cameras are properly configured and to test sound and video quality. To begin recording, the user simply "presses" (i.e., places the mouse cursor over, and clicks) the prominent circular "Start Recording" button 48 on the Recording Panel shown in FIG. 2, much like pressing the Record button on a conventional audio tape recorder. The operator then walks around the room, speaks into each microphone, and stands before each camera position, and then returns to personal computer 38 to stop recording, as by "pressing" the "Stop Recording" button 50. With the recording stopped, the operator can playback the video test recording over the monitor 53 and the audio (in a manner described in greater detail below), either over speakers or the private headphones 52 shown in FIG. 1. If both the audio and video were recorded properly onto the computer's hard disk, the operator is ready to "go on the record" by simply "pressing" the Start Recording button 48 once more.

Once the court is on the record, the operator can observe the video on the monitor 53 or in a separate window on the monitor 40 and listen to all proceedings using headphones 52 connected to personal computer 38; this function is known as "confidence monitoring". During confidence monitoring, personal computer 38 accesses from its hard drive digital signals recently stored on the hard drive and sends the accessed signals back to the sound and video cards. A digital-to-analog converter circuit within the sound card converts the accessed digital signals back to electronic audio signals. Headphones 52 are plugged into the output port of the sound card for transforming the converted electronic audio signals into audible sounds, thereby allowing the user to monitor the signals being stored on the hard drive. The displayed video on the monitor 53 (or, alternatively, on the monitor 40) and the audible sounds generated by headphones 52 are always approximately one-half second behind the "live" courtroom video and sound. This is because the operator is actually watching and listening to digital audio and video signals that have already been stored on the hard drive within personal computer 38. By watching and listening to the actual stored digital video and audio signals already recorded on the hard drive, the operator can be confident that every word spoken (and seen) in the courtroom was audible and safely stored on the ha-rd drive, hence the name "confidence monitoring".

Still referring to FIG. 2, during each recording session, the Start Recording button 48 brightens, and a large "current record time" clock 53 is displayed on the recording panel, thereby indicating to the operator that the system is recording; the time displayed by the "current record time" clock 53 is the real clock time at any particular moment. In other words, if the current time is 3:45 p.m and 22 seconds, then the "current record time" clock 53 displays "3:45:22". An optional large external clock display (not shown) can be connected to an available serial COM port on personal computer 38 and can be placed on the judge's bench, the clerk's table, or mounted on the wall to display the same time appearing on clock 53 of the Recording Panel. Any system failure that might stop recording, will be immediately obvious because the clocks will stop instantly. Moreover, any of the participants may simply make a note of the current time at some crucial point of testimony or argument; the current recording time can later be used to quickly access the relevant portion of the transcript.

In addition to the current record time clock 53, the Recording Panel shown in FIG. 2 constantly displays other relevant information; for example, the name of the courtroom where the recording is taking place, and the current date are displayed in panel 54 for the operator at the top of the Recording Panel. A remaining time panel 56 is displayed just under the start and stop buttons 48 and 50, allowing the operator to see how much space remains available on the personal computer's hard disk for recording additional video and audio input. This information can be displayed in recording time remaining (as shown in FIG. 2), megabytes remaining, percentage of disk space used, or as a simple progress bar showing the amount of disk space used.

Similarly the recording panel shown in FIG. 2 preferably includes a panel 58 to display either the remaining recording time and/or space available on the permanent storage removable disk (e.g., CD-R disk). This allows the operator to know how full an archive disk is getting, and whether the operator needs to switch archive disks. As mentioned above, however, if CD-R is used for archiving, the operator should be able to get an entire day's proceedings on a single CD, thus eliminating the need to switch disks during the day. If archiving to lower capacity disks, such as Zip disks, the operator may need to change disks every few hours. It should be appreciated that archiving can be stopped, and an archive disk changed, without having to stop recording or interrupt the court proceedings. When the new archive disk is inserted, any digital audio already stored on the hard drive that has not been archived will be copied to the new disk immediately when archiving is restarted, and archiving will thereafter continue normally.

The operator can go on and off the record as frequently as needed by simply "pressing" stop button 50 to go off the record, and by pressing the start button 48 to go back on the record. Thus, control buttons 48 and 50 of the recording panel serve as a means for signaling personal computer 38 to start recording the digital signals, and for signaling the computer to stop recording the digital signals, respectively, in order to define a recording session. Any audio or video information that had not already been copied to the permanent storage media will be copied immediately upon stopping a recording. The operator can then remove the archive media and store it for later retrieval as needed. Digital signals stored on the computer's hard drive are never deleted until they have been safely written to the removable digital media.

The operator need not worry about saving files, or naming files, because file creation and file naming are handled automatically by the software. Personal computer 38 is responsive to start button 48 and stop button 50 for storing the digital signals on the hard drive during each recording session. The manner by which such signals are stored, and the file creation and file naming routine implemented by personal computer 38, will now be described.

In the preferred embodiment of the present invention, as each recording session begins (i.e., each time the operator presses start button 48), a new, distinct file segment is created. The term "file segment" is used because a great number of file segments stored on a given day may collectively form a single "virtual file".

As each file segment is created, personal computer 38 associates the current date and time, and preferably, the location of the court (e.g., Courtroom 14) with each file segment. While such associations may be established by using data look-up tables, or by embedding such information within a data field stored by such file segment, the preferred embodiment of the present invention actually incorporates the date of creation (i.e., the date on which the recording was made), time of creation, and location within the file name itself, thereby creating a unique file name for each such file segment. Note that, unlike the Microsoft Windows® file-attribute convention, the time of creation saved in the file segment name is the start time at which this file segment first starts to record digital audio, and not the time at which the file was last modified. A four minute recording session will cause a particular file segment to be updated constantly over the four minute period, yet the file segment name does not change; the time component of such file segment name is determined by the start time, not by the stop time. It will be noted that the same unique file segment names are used when such file segments are copied to external archival media, such as Recordable CDROM disks.

One of the features of the present invention mentioned above is that personal computer 38 monitors the time length of each file segment being stored during a current recording session; once the file segment currently being used to store incoming digital audio signals reaches a predetermined time length, e.g., five minutes of stored digital signals, personal computer 38 stops appending any additional data to the current file segment, and instead creates, names, and opens a new file segment for storing an additional portion of the current recording session. This procedure ensures that any corrupted digital signals are limited to five-minute segments, and hopefully prevents one corrupted segment from degrading the prior or succeeding segment. Any recording sessions that exceed the five minute limit result in the creation of at least two file segments during such recording session. If a segment of a trial were to run continuously on the record for 57 minutes, then that recording session would create 12 file segments, each having a file name that indicates the time at which such file segment began recording.

Figure 6A:
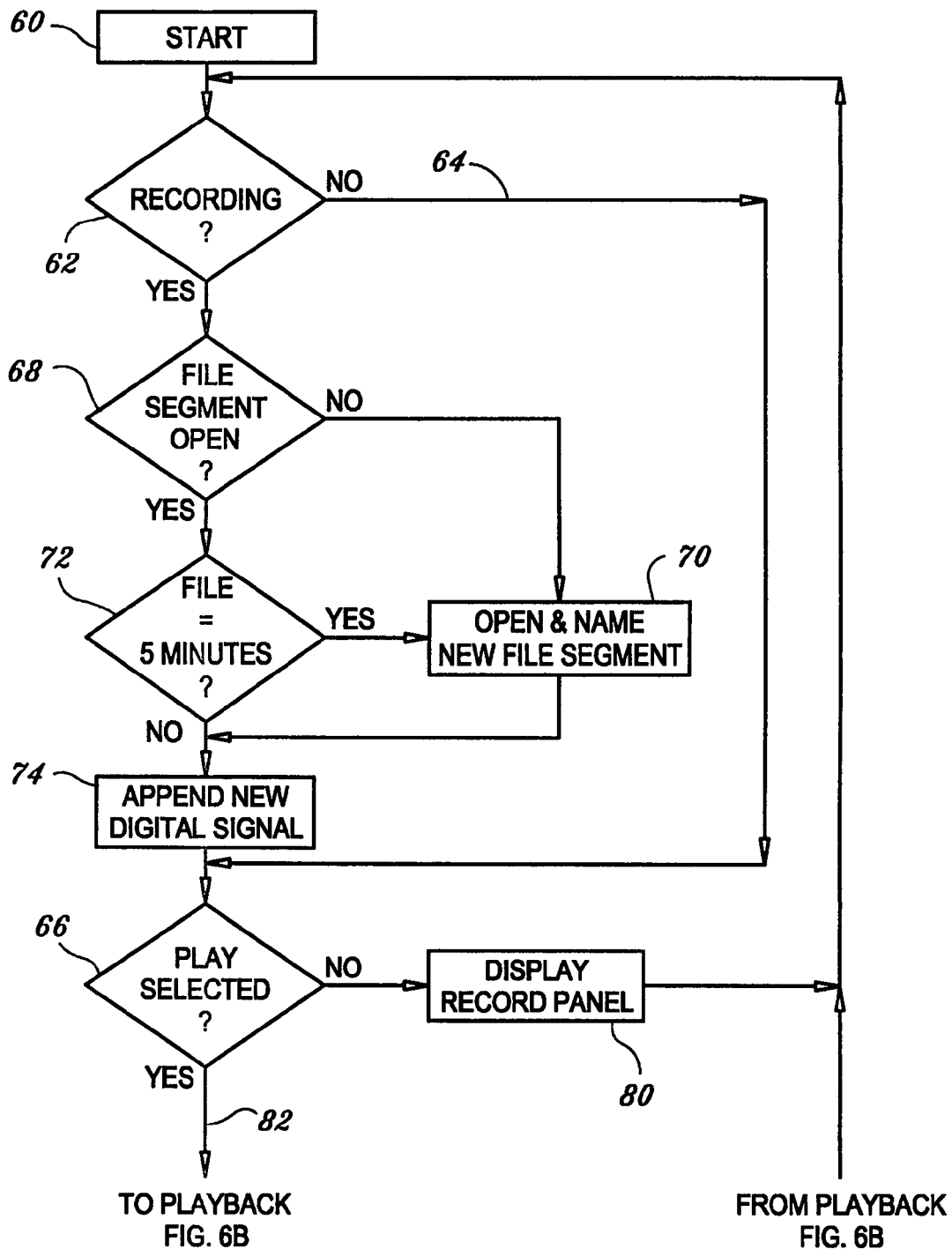
FIGS. 6A-6B form a flowchart illustrating the steps performed by the personal computer under the direction of a software program for recording and for playing back stored digital audio/video files.

Referring to FIG. 6A, the recording process, as controlled by the software loaded into personal computer 38, is illustrated in flowchart format. Start box 60 indicates the starting point when the software program is loaded. The next step is to determine whether the Start Recording button 48 has been "pressed" to start recording, or whether the Stop Recording button 50 has been pressed to end recording, all of which is represented by decision diamond 62; if recording has been stopped (or never started), then control branches downwardly along path 64 to decision diamond 66. On the other hand, if recording has been started and has not yet been stopped, then control passes to decision diamond 68 to determine whether a current file segment has already been opened to store the incoming digital signals. If the answer is "no", as when Start Recording button 48 has just been pressed, then personal computer 38 creates a new file segment, naming it in accordance with the convention described above, as represented by box 70.

Assuming that a current file segment was already open, control passes to decision diamond 72 to determine if the current file segment has already reached the maximum time length (e.g., five minutes of recording time) that is permitted. If so, control is directed to box 70 to create a new file segment. In either case, control then passes to box 74 for causing the new incoming digital signal data to be appended to the active file segment. Control then passes to decision diamond 66 to determine whether the user has requested playback mode.

Referring again briefly to the recording panel (displayed on the computer monitor 40) shown in FIG. 2, a Panel Change button 76 is displayed adjacent panel label 78. When the operator desires to playback a portion of the recorded digital transcript, the operator places the mouse cursor over Panel Change button 76 and clicks the mouse button to signal that playback mode is desired. In this event, monitor 40 of personal computer 38 no longer displays the recording panel shown in FIG. 2, and instead displays the playback panel shown in FIG. 3. Thus, monitor 40 displays a first screen appearance (the Recording Panel) for controlling recording operations, and displays a second screen appearance (the Playback Panel) for controlling playback operations. The second appearance of the Playback Panel is uniquely different from the appearance of the Recording Panel so that the operator is never confused about which mode has been selected. Panel Change button 76 serves as a means for toggling the display between the Recording Panel and the Playback Panel, depending upon whether the user desires to control recording operations or playback operations, respectively.

Like the recording panel, the playback panel also includes a panel label 78, but the panel label 78 now displays "PLAYBACK PANEL" rather than "RECORDING PANEL". Panel Change button 76 is also displayed in the playback panel, and pressing the Panel Change button 76 toggles the computer screen display back to the recording panel shown in FIG. 2. It should be noted that merely toggling from the recording panel of FIG. 2 to the playback panel of FIG. 3 does not stop a recording session that is in progress; personal computer 38 continues to receive digital video and audio signals from the video card and the sound card, and continues to write digital video and audio transcript signals to the hard drive, even when the playback mode is invoked, at least until the user presses the stop recording button 50.

Thus, returning to FIG. 6A, diamond decision box checks which display mode (recording panel or playback panel) the user has last selected. If the user had already toggled to the recording panel, or has just pressed the Panel Change button 76 to return to the recording panel, then control is directed to box 80 for causing the recording panel to be displayed on monitor 40. On the other hand, if the user had already toggled to the playback panel, or the user has just pressed the Panel Change 76 button to change from the recording panel to the playback panel, then control is directed to the playback mode along path 82 to FIG. 6B.

During proceedings, if a playback is requested, the operator can simply click the Panel Change button 76 to switch to the Playback Panel and replay any portion of the session currently being recorded, or any portion of a previously recorded session. Because the recording function is completely independent from playback, personal computer 38 keeps recording digital video and audio transcript input even as the playback occurs.

Before accessing recordings for playback, a user must first select a virtual file that contains the desired digital transcript. Assuming that the Playback Panel is displayed, the user "presses" the Open File button 84 on the Playback Panel shown in FIG. 3. This action causes monitor 40 to temporarily display a file listing of the type shown in FIG. 5.

Figure 5:
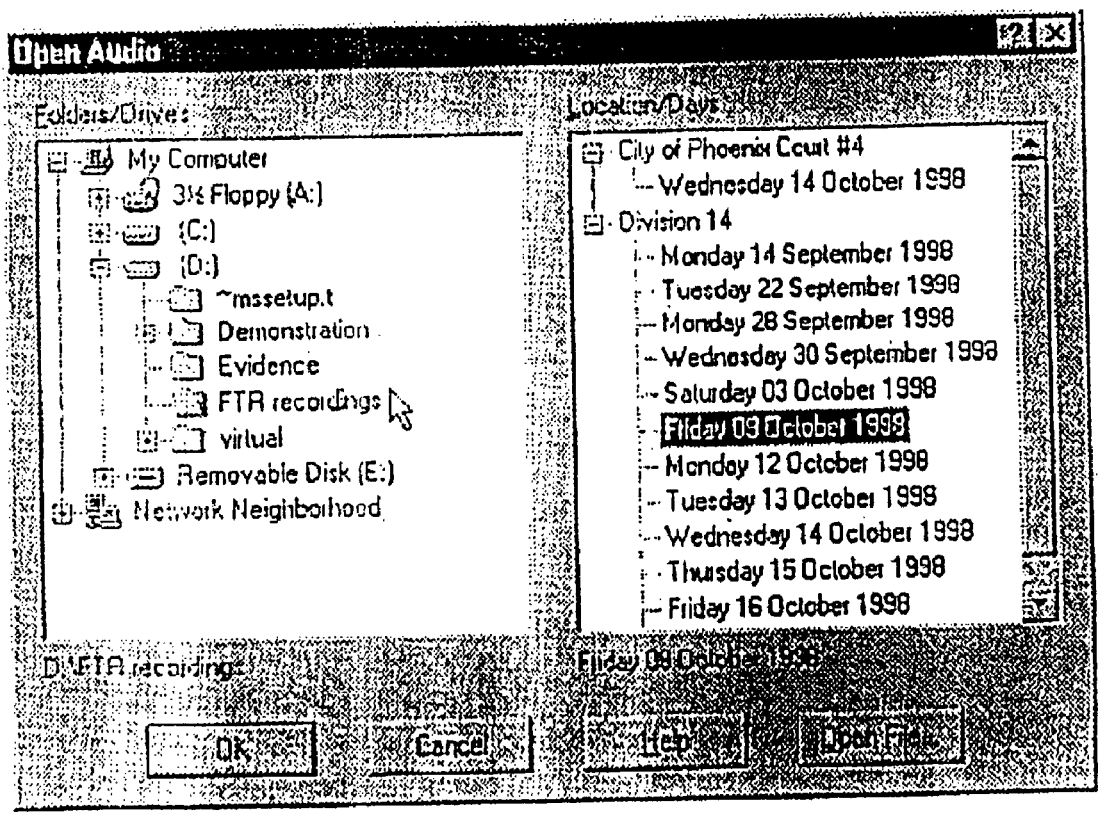
FIG. 5 is an image of a directory as displayed on the personal computer monitor and showing various stored digital files by location and date.

Instead of displaying all file segments created and stored on the hard drive, the file listing shown in FIG. 5 displays virtual files, each of which might be made up of tens or hundreds of recorded file segments. Each such virtual file indicates the date corresponding to the date on which each such proceeding was recorded. In addition, the virtual files are grouped by location ("Court #4", "Division 14", etc.). The computer 38 is able to derive the virtual file information shown in FIG. 5 by examining the file names of all the file segments and grouping such file segments into like dates for given locations. While not the preferred method, it is also possible to build virtual files using a time division different from a day; for example, it would be possible to display virtual files for a given week or a given month, if desired.

The user selects a desired file shown on the right-hand panel of FIG. 5 by scrolling up or down until the desired virtual file is displayed, and then moving the mouse cursor to the desired virtual file name and clicking on such file. In this manner, the display monitor 40 and mouse 44 serve as one form of a means for allowing a user to select a desired virtual file entry for playback from among those virtual file entries indicated by the display. Computer 38 responds to the user's virtual file selection by selecting all file segments which collectively correspond to the desired virtual file (i.e., all those having the specified date and location) and orders such file segments by the recording start time indicated by their respective file names. Upon selecting the desired virtual file, the appearance of the Playback Panel of FIG. 3 changes to that shown in FIG. 4.

Figure 4:
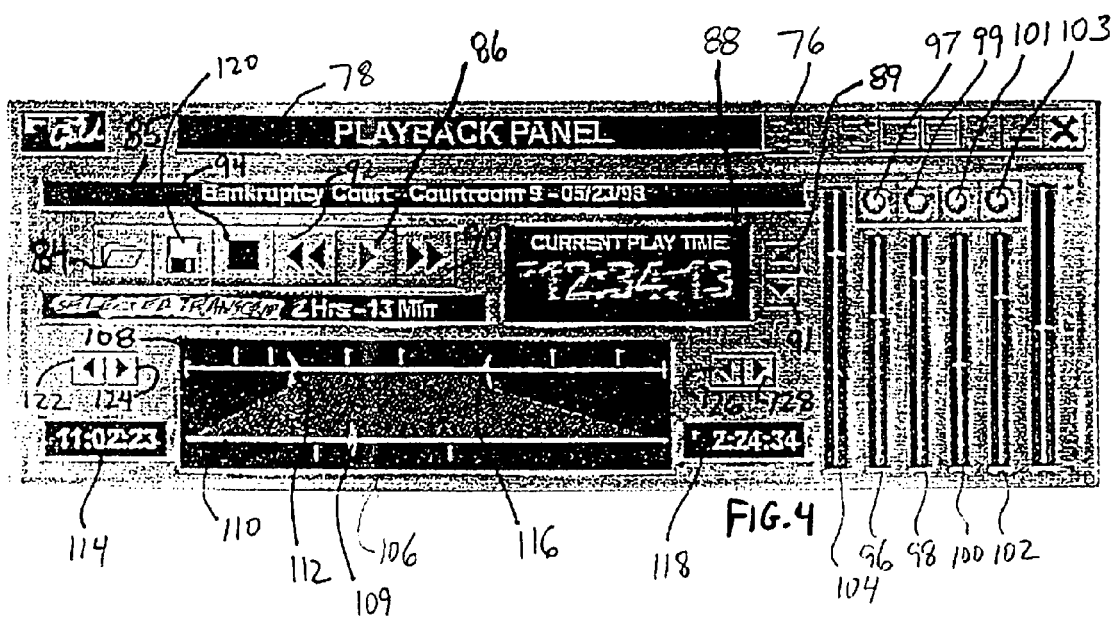
FIG. 4 is an image of the playback panel shown in FIG. 3 after a stored digital audio/video file has been loaded for playback.

Like the Recording Panel shown in FIG. 2, the Playback Panel of FIG. 4 includes a display panel 85 which displays the location and date of the original recording selected by the user. The Playback Panel includes the standard "buttons" that one would ordinarily find on an audio tape or video tape courtroom recording system, including a Play button 86, a Fast Forward button 90, a Rewind button 92, and a Stop button 94. To view and/or listen to the selected recording, the user simply presses the Play button 86 on the playback panel. Unless the user otherwise specifies, playback will start with the earliest file segment, i.e., the first recording session, of the specified date. As shown in FIG. 4, the Playback Panel includes a current play time display 88 which displays the time at which the recorded digital transcript currently being played back was originally recorded. A pair of buttons 89 and 91 can be "pressed" with the mouse cursor to rapidly increment or decrement the current play time to a desired value. Alternatively, the user can simply place the mouse cursor over the hours, minutes, or seconds portion of Current Play Time window 88, left-click the mouse, and thereby highlight a portion of the current play time; the user can then type desired values for the current play time on the keyboard 42 to cause playback to proceed to such portion of the recorded digital transcript.

Thus, the Playback Panel is a means for signaling the computer to access particular stored digital transcript signals (video and audio) from the hard drive, or from an external archival storage medium, for playback. Based upon the time displayed in the Current Play Time display 88, personal computer 38 retrieves the file segment containing the digital video and audio transcript that was recorded at the displayed time and plays it back through the video card and sound card installed impersonal computer 38. Playback may be heard over a public address system in the courtroom, over headphones 52, or via any computer audio speakers coupled to the sound card. Simultaneous video display may take place over the monitor 53 and additional monitors, if desired.

As was mentioned previously, toggling to the Playback Panel does not, in and of itself, interrupt real time recording. Even though personal computer 38 is accessing the hard drive to retrieve digital information (audio and video) recorded earlier in the proceedings, the cameras 33, 35 (or other video input) and the microphones 22-32 are still "live". The audio signals processed by mixer 34 continue to be sent to the sound card for storage as digital audio signals on the hard drive in real time, as well as the digital video signals. This parallel mode of operation continues until such time as playback is concluded, or until the user positively stops recording, as by "pressing" the Stop Recording button 50 in the Recording Panel.

The Playback Panel also includes a series of four slider controls 96, 98, 100, and 102. By placing the mouse cursor upon one of such slider controls and holding the left-click mouse button down, the user can "drag" such slider controls up or down to increase or decrease the volume of any of the four sound channels. The user can also isolate one or more channels from the others by turning off certain channels to focus upon a particular speaker and/or to cut out extraneous noise. Channels can be enabled or disabled by toggling the channel-enable buttons 97, 99, 101, and 103. Preferably, the color of such channel buttons will be green if such channel is enabled, and red if such channel has been disabled. Likewise, a Master Volume Control slider 104 can be manipulated by the user in the same fashion to simultaneously increase or decrease the volume of all four channels.

Figure 3:
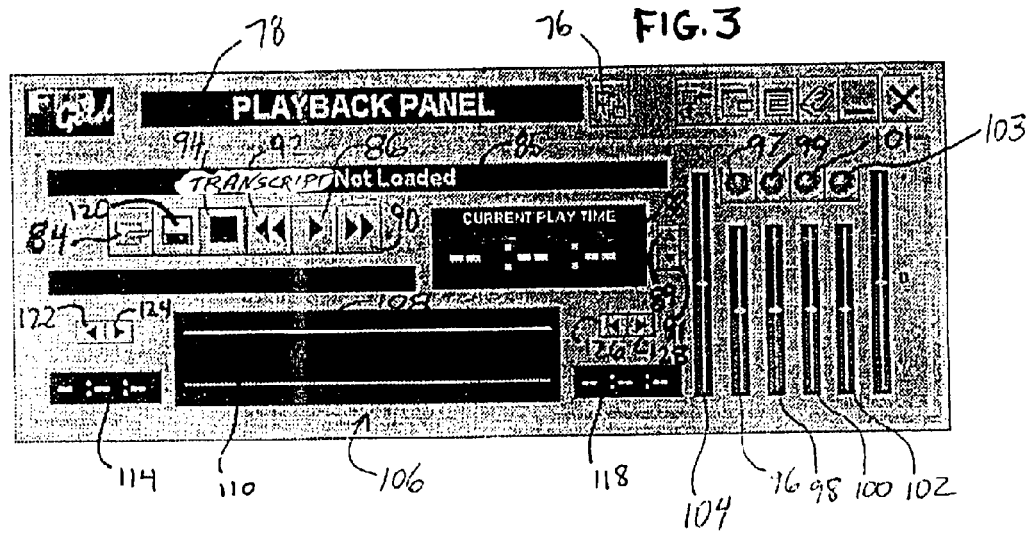
FIG. 3 is an image of a playback panel as displayed on the personal computer monitor before the loading of a stored digital audio/video file.

Still referring to FIGS. 3 and 4, the Playback Panel includes a graphical display window 106 which displays an upper timeline 108 and a lower timeline 110. Upper timeline 108 graphically displays an entire day's recording for the selected virtual file. In FIG. 4, tick marks are displayed within upper timeline 108. These tick marks indicate discontinuities in the recorded record, as when recording was stopped and later restarted. The lower timeline 110, or audio slider bar, serves as a "Zoom" feature to enlarge that portion of the upper timeline 108 that falls within a selected range. A marker 109 superimposed upon the lower timeline 110 indicates the current play time within the selected range. A user can quickly adjust the current play time by "grabbing" marker 109 with the mouse cursor and "dragging" it back and forth until the desired play time is displayed in Current Play Time window 88.

When reviewing lengthy sessions of recorded information, selecting a smaller range within which to navigate improves the resolution of the slider bar and facilitates the user's ability to review the record. A first arrow 112 shown in FIG. 4 on upper timeline 108 indicates a selected starting point (i.e., starting time) within a selected range; that starting time is displayed by window 114. Likewise, a second arrow 116 shown in FIG. 4 on upper timeline 108 indicates a selected ending point (i.e., stopping time) for the selected range; that stopping time is displayed by window 118.

Personal computer 38 is responsive to the selected starting point and ending point for creating a subset virtual file, the subset virtual file including only those file segments (or partial file segments) which contain digital signals recorded between the selected starting point and selected ending point. The user can then playback the subset virtual file, if desired. Alternatively, the user can save the selected digital portion to a network location or onto a new Writable CDROM disk, or onto a Zip disk, as by "pressing" the Save button 120. This procedure is very similar to saving a file from within any Windows application. Clicking on Save button 120 opens a dialog box that includes a list of drives, and folders within such drives, showing the possible storage locations. The user simply indicates the desired storage location for the selected range of information, and clicks a further Save button (not shown) to complete the process.

There are several methods for selecting a desired range. For example, the user can adjust the starting point by "pressing" the Decrement and Increment buttons 122 and 124, respectively, located above start time window 114. Likewise, the user can adjust the stopping point by "pressing" the Decrement and Increment buttons 126 and 128 located above stop time window 118. Alternatively, the user can "grab" arrow 112 with the mouse cursor and "drag" it to a new starting time; as arrow 112 is dragged back and forth along timeline 108, the starting time window 114 is updated to reflect the new starting time. The stopping time can similarly be adjusted by dragging arrow 116.

Figure 6B:
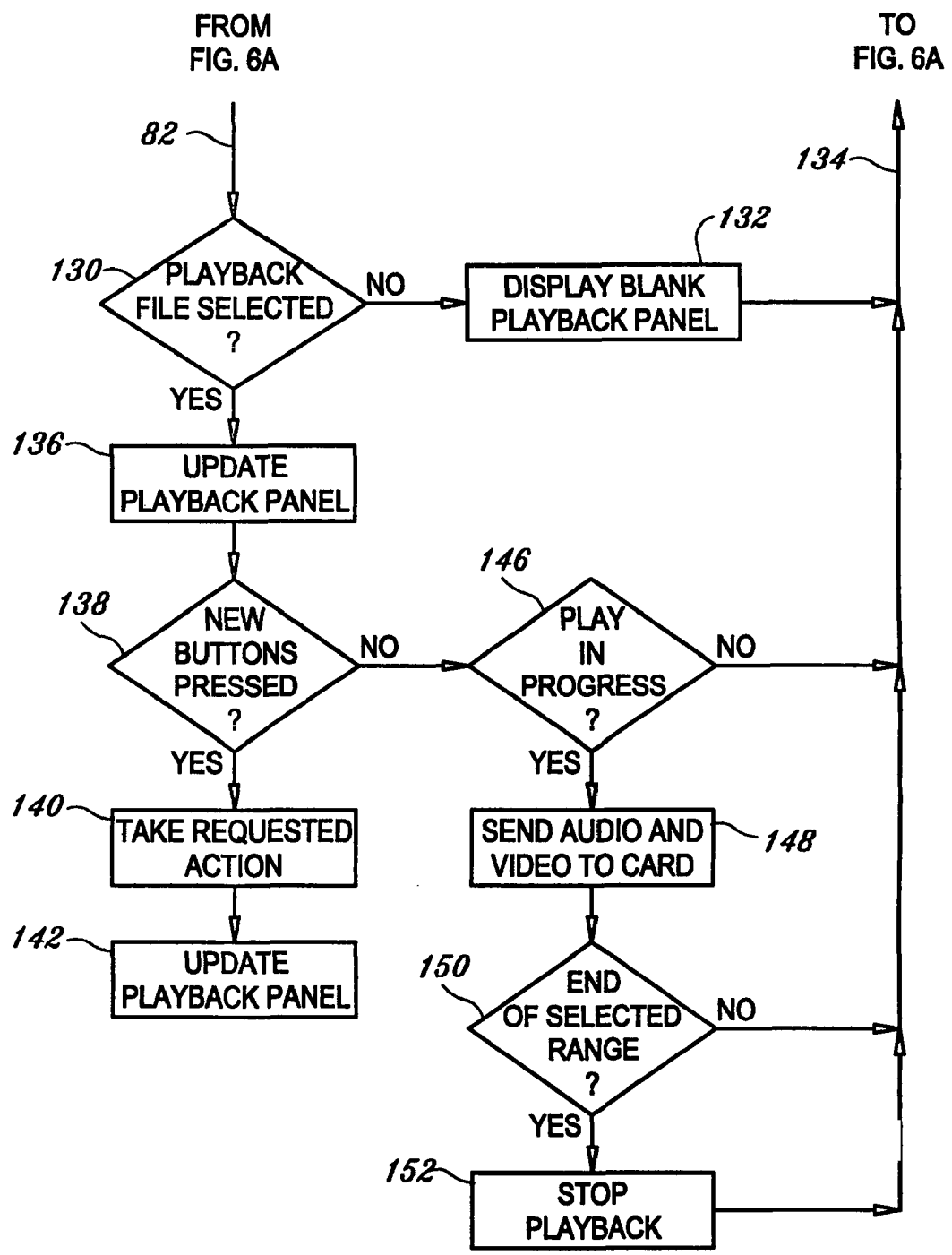

The flowchart of FIG. 6B illustrates the basic steps performed by the software for controlling personal computer 38 relative to playback operations. Path 82 indicates that control is being passed from FIG. 6A to FIG. 6B because the user had already toggled to the playback panel, or the user has just pressed the Panel Change 76 button to change from the recording panel to the playback panel. On the other hand, if personal computer 38 is, for example, a judge's or lawyer's personal computer, configured for playback operations only, then path 82 can represent the starting point of control flow, as when the user launches his or her software to view video transcript and/or listen to a copy of a digital audio transcript that was previously recorded in the courtroom. At decision diamond 130, personal computer 38 checks to see whether the user has already selected and opened a virtual file for playback; if not, then control passes to box 132, and personal computer 38 displays the "blank" playback panel shown in FIG. 3, reminding the user that no transcript file has been loaded. Control then loops back to the top of FIG. 6A along path 134; alternatively, if this is a playback only personal computer, control can return to path 82 to check again whether the user has selected a file for playback.

If decision diamond 130 determines that the user has already selected a virtual file for playback, then control passes to box 136 to refresh the displayed playback panel on the user's monitor 40; for example, if the user has just selected a virtual file for playback by selecting a file from the directory screen shown in FIG. 5, then the Playback Panel appearance is changed from that of FIG. 3 to that of FIG. 4. Control then passes to decision diamond 138 which determines whether the user has "pressed" any of the Playback Panel control buttons; for example, has the user pressed the Stop button 94 to stop a playback that was in progress. If so, control passes to box 140 wherein the action requested by the user is performed. After performing the requested action, control passes to box 142 to update the Playback Panel. For example, if the user had pressed the Increment Current Play Time button 89, then the displayed Current Play Time would need to be refreshed to show a later Current Play Time. Control then passes along path 144 to decision diamond 146. It will be noted that if decision diamond 138 determined that no new buttons had been pressed, then control is also passed to decision diamond 146.

Decision diamond 146 determines whether or not playback of a selected digital audio file was already in progress. For example, if the user had just selected a virtual file for playback, but had not yet pressed Play button 86, then the answer to this question would be "No", in which event control would be returned along path 134 back to FIG. 6A. If playback of the selected file was in progress, then control passes to box 148 for sending a new segment of the stored file of digital audio to the sound card for playback, and the video to the video card for display on the monitor 53. The new segment of these stored files corresponds to the Current Play Time displayed in the Playback Panel. While such segments of the stored file are sent to the video and sound cards in segmented fashion, the process is repeated frequently enough that the sounds heard (and video seen) by the user are perceived as being continuous. Control then passes to decision diamond 150 to determine whether playback has progressed to the end of the selected virtual file, or to the end of the selected range of such file. If not, then control is returned along path 134. However, if the end of the virtual file, or the end of the selected range within such file has been reached, then playback is stopped, as indicated by control box 152. Control is again returned along path 134 back to the top of FIG. 6A.

Assuming that the court record is stored and distributed on CD-ROM, later retrieval and review of the audio record is quite simple. In addition to providing an effective long-term storage medium for the court's records, CDROMs are ideal for distribution of the audio record to attorneys and litigants wishing to purchase a copy of the audio record for review. Any user (the judge, a lawyer, a transcriber) can simply place the CD in his or her computer's CD player and, using the Playback Panel software described above, load a day's worth of audio into the playback panel application. With the playback panel, the user will see on his or her computer screen the name of the courtroom where the recording took place, and the date of the recording or recordings. The user can instantly select, view and listen to any specific time for which he or she wishes to review the transcript. Using the aforementioned ranging feature and the Save button 120, the court can easily save requested segments onto a blank CD. The necessary playback software can also be saved on distributed CDs, thereby allowing an attorney to listen to and view the digital recording without the need to purchase any additional software. With more than 6½ hours of recording stored on a single CD, a user can review an entire day of court record quickly and easily. Users can easily note the time of specific events during court proceedings and instantly return to that moment in the recording later for review. Imagine a clerk that needs to find a specific case that was heard for just a few minutes on a certain day. By loading that day's record into the Playback Panel, the clerk can simply enter the time noted by the operator as to when that case began, and the desired record will be immediately available, without the need to fast forward or rewind tapes in order to find a certain case. Judges and attorneys can use the same technique to find pieces of the court record they may want to review.

The digital transcription system described above can be configured on either a desktop computer at a fixed location, or on a mobile computer as a portable system for traveling judges and/or hearing officers. The software is substantially the same, and the data collected on either type of system are fully interchangeable. Once a system has been set up at a hearing site, the operation is identical to that described above. The system could be installed on a laptop computer or other computer, and include a small mixer, microphones, cables and all other necessary accessories to make the portable system function in the same manner as described above for a fixed location. For the purpose of creating permanent storage, the laptop or other computer can be equipped with an external CD-R, Magneto Optical, or Jaz drive, or an internal Zip drive, much like a desktop system.

Those skilled in the art will now appreciate that an improved digital transcription system has been described which makes the recording of digital and video signals in a courtroom, hearing room, or similar environment relatively easy and failsafe. Up to four channels of digital audio can be recorded at a time in addition to video; and the recorded data can be archived on a continuous basis. The user can employ confidence monitoring to confirm that the digital video and audio signals are actually being stored on the computer's hard disk, and that recording is taking place properly. Recorded digital information can be easily and quickly accessed for playback, and without interrupting recording of the court record in real time. Copies of the digital record and/or selected segments thereof can be easily copied onto CD-R disks for convenient and inexpensive distribution to transcriptionists, judges, lawyers. A full day's recording of information can easily be stored and permanently archived on a single CD-R disk, which is more stable over time than conventional magnetic media. Control of the recording and playback operations is simplified by using a computer monitor/mouse pointer interface that resembles the control buttons on a conventional audio or video tape recorder/player. The disclosed system avoids the need for regular maintenance of the type required by conventional tape recorders. Moreover, a judge or attorney who wants to mark a critical portion of the transcript need only make note of the time in order to later find such portion easily. In addition, copies of the transcript can be made almost immediately after the conclusion of a day's proceedings.

The preferred embodiment of the present invention includes both the ability to record digital audio and video information and also the ability to playback the recorded digital transcript. Nonetheless, embodiments of the present invention are also possible wherein only the record capability (perhaps supplemented with confidence monitoring), or only the playback capability are provided. For example, a judge or law clerk desiring only to view or listen to playback of an archived recording need not have the ability to record information on his or her personal computer.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

We claim:

1. A digital playback system for viewing and listening to previously recorded digital audio/video files, such digital files each being comprised of file segments, each of such file segments having a date and time of recording associated therewith, said digital playback system including in combination:
   a) a storage device containing prerecorded digital audio/video files including the date and time of recording thereof;
   b) a computer for accessing said prerecorded digital files in the storage device;
   c) a circuit coupled to said computer for receiving digital audio/video signals from the audio/video files accessed by the computer for reproducing the digital signals to electronic audio and video signals;
   d) a display coupled to said computer for allowing a user to display digital file entries corresponding to date and periods of time of recording during which at least one recording session was recorded; and
   e) playback selection means for allowing a user to select a desired digital file entry from those file entries indicated by the display; and
   f) wherein the computer is responsive to the playback selection means for identifying all file segments stored on the selected entry date, and which collectively represent a selected virtual file entry, and further wherein the computer allows the display to depict a first Graphical time line representing the selected virtual file entry in the form of an entire period's worth of recording sessions from the selected source of signals for the desired period of time.

2. The digital playback system recited by claim 1 wherein said computer allows the display to depict a second graphical timeline representing a selected range within the selected virtual file entry in the form of a subset of the digital signals recorded during the selected period of time, the selected range having a starting point and a stopping point.

3. The digital playback system recited by claim 2 wherein a marker is depicted on the second graphical timeline indicating the location within the selected range at which playback of digital signals is currently taking place.

4. The digital playback system recited by claim 2 wherein range indicators are superimposed upon said first graphical timeline to show the starting point and stopping point of the selected range.

5. The digital playback system recited by claim 1 wherein said playback selection means allows the user to select a desired starting point and a desired ending point on the first graphical timeline, and wherein said computer is responsive to the selected starting point and ending point for creating a subset virtual file, the subset virtual file including only those file segments which contain digital signals recorded during between the selected starting point and selected ending point.

* * * * *